United States Patent [19]
Anderson et al.

[11] Patent Number: 6,082,076
[45] Date of Patent: Jul. 4, 2000

[54] BALE WRAPPING MACHINE

[75] Inventors: David W. Anderson, Aberdeenshire, United Kingdom; Oscar Frey, Listowel, Canada

[73] Assignee: DWA Technologies Limited, Aberdeenshire, United Kingdom

[21] Appl. No.: 09/164,514

[22] Filed: Sep. 30, 1998

[30] Foreign Application Priority Data

Oct. 1, 1997 [CA] Canada ................... 2217075

[51] Int. Cl.[7] .................................. B65B 41/18
[52] U.S. Cl. ...................... 53/176; 53/588; 53/210; 53/587
[58] Field of Search ............... 53/176, 587, 588, 53/591, 210, 211

[56] References Cited

U.S. PATENT DOCUMENTS

| | | | |
|---|---|---|---|
| 4,641,484 | 2/1987 | Popelka | 53/587 X |
| 4,685,270 | 8/1987 | Brambilla | 53/176 |
| 4,730,436 | 3/1988 | Angelino | 53/176 X |
| 4,793,124 | 12/1988 | Anderson | 53/588 |
| 5,660,023 | 8/1997 | Kivela | 53/176 X |
| 5,661,956 | 9/1997 | Tardif | 53/588 |
| 5,689,934 | 11/1997 | Scherer et al. | 53/176 X |

*Primary Examiner*—Linda Johnson
*Attorney, Agent, or Firm*—Pearne & Gordon LLP

[57] ABSTRACT

A bale rotator is provided in a bale wrapping machine which wrape multiples end to end in a row. when the bale wrapping machine is used to wrap bales individually, the bale rotator is used to rotate a bale so that the bale is wrapped with plastic strip in at least two different angles. Thus, the bale wrapping device is capable of wrapping bales individually or wrapping bales end to end in a row.

31 Claims, 8 Drawing Sheets

BALE WRAPPING MACHINE

This invention relates to a bale wrapping machine for wrapping bales of silage, hay or the like, in plastic, and more particularly, to a bale wrapping machine which can wrap bales individually or wrap bales end to end in a row.

BACKGROUND OF THE INVENTION

It is known to wrap bales of freshly cut grass with plastic strip. Bales may be wrapped individually, as is discussed, for example, in U.S. Pat. No. 4,641,484 issued on Feb. 10, 1987 to Popelka.

It is also known to wrap bales end to end in a continuous row, as is discussed in, such as Canadian Patent 1,285,862 issued on Jul. 9, 1991 to Anderson and U.S. Pat. No. 4,793,124 issued on Dec. 27, 1988 to Anderson.

Wrapping bales end to end is generally a superior method of wrapping bales, as less plastic is used and the wrapping process is quicker. However, it is advantageous, in certain circumstances, to wrap at least some bales individually; for example, it may be desired to transport a wrapped bale to another location after wrapping.

SUMMARY OF THE INVENTION

An object of the present invention is to provide a bale wrapping machine which is capable of wrapping bales individually or wrapping bales end to end in a row.

To this end, the present invention uses a bale rotator in a bale wrapping machine which wraps multiple bales end to end in a row. When the bale wrapping machine is used to wrap bales individually, the bale rotator is used to rotate a bale so that the bale is wrapped with plastic strip in at least two different angles. Thus, the entire surface of the bale may be wrapped.

In accordance with an aspect of the present invention, there is provided a bale wrapping machine for wrapping bales with plastic strip. The bale wrapping machine comprises a machine mover for enabling the machine to move along a ground surface during the wrapping operation of bales; a bale receiving support for receiving bales; a bale wrapping device adjacent the bale receiving support for carrying plastic strip around a bale; an inclined support adjacent the bale wrapping device for transporting wrapped bales to a ground surface; a first bale mover for moving bales from the bale receiving support towards the bale wrapping device so as to move bales in a first plane in the bale wrapping device; and a bale rotator adjacent the bale wrapping device for rotating a bale in a second plane at an angle to the first plane.

In accordance with another aspect of the present invention, there is provided a bale rotating device for rotating a bale in a bale wrapping machine for wrapping bales with plastic strip. The bale wrapping machine has a machine mover for enabling the machine to move along a ground surface during the wrapping operation of bales; a bale receiving support for receiving bales; a bale wrapping device adjacent the bale receiving support for carrying plastic strip around a bale; an inclined support adjacent the bale wrapping device for transporting wrapped bales to a ground surface; and a first bale mover for moving bales from the bale receiving support towards the bale wrapping device so as to move bales in a first plane in the bale wrapping device. The bale rotating device comprises a bale rotator for rotating a bale in a second plane at an angle to the first plane; and a bale rotator connector for connecting the bale rotator to the bale wrapping machine.

An advantage of the present invention is that a single machine may be used to wrap bales individually or to wrap bales end to end in a continuous row.

Other advantages, objects and features of the present invention will be readily apparent to those skilled in the art from a review of the following detailed description of preferred embodiments in conjunction with the accompanying drawings and claims.

BRIEF DESCRIPTION OF THE DRAWINGS

The invention will be further understood from the following description with reference to the drawings in which.

DETAILED DESCRIPTION OF THE PREFERRED EMBODIMENTS

Referring to FIGS. 1–10, preferred embodiments of a bale wrapping machine in accordance with the present invention are described. A single/multi bale wrapping machine 110 shown in FIG. 1 uses a bale rotator comprising powered rollers. Single/multi bale wrapping machines 200, 300 shown in FIGS. 2 and 10 use a bale rotator comprising a rotating support and a support actuator.

Figure 10:
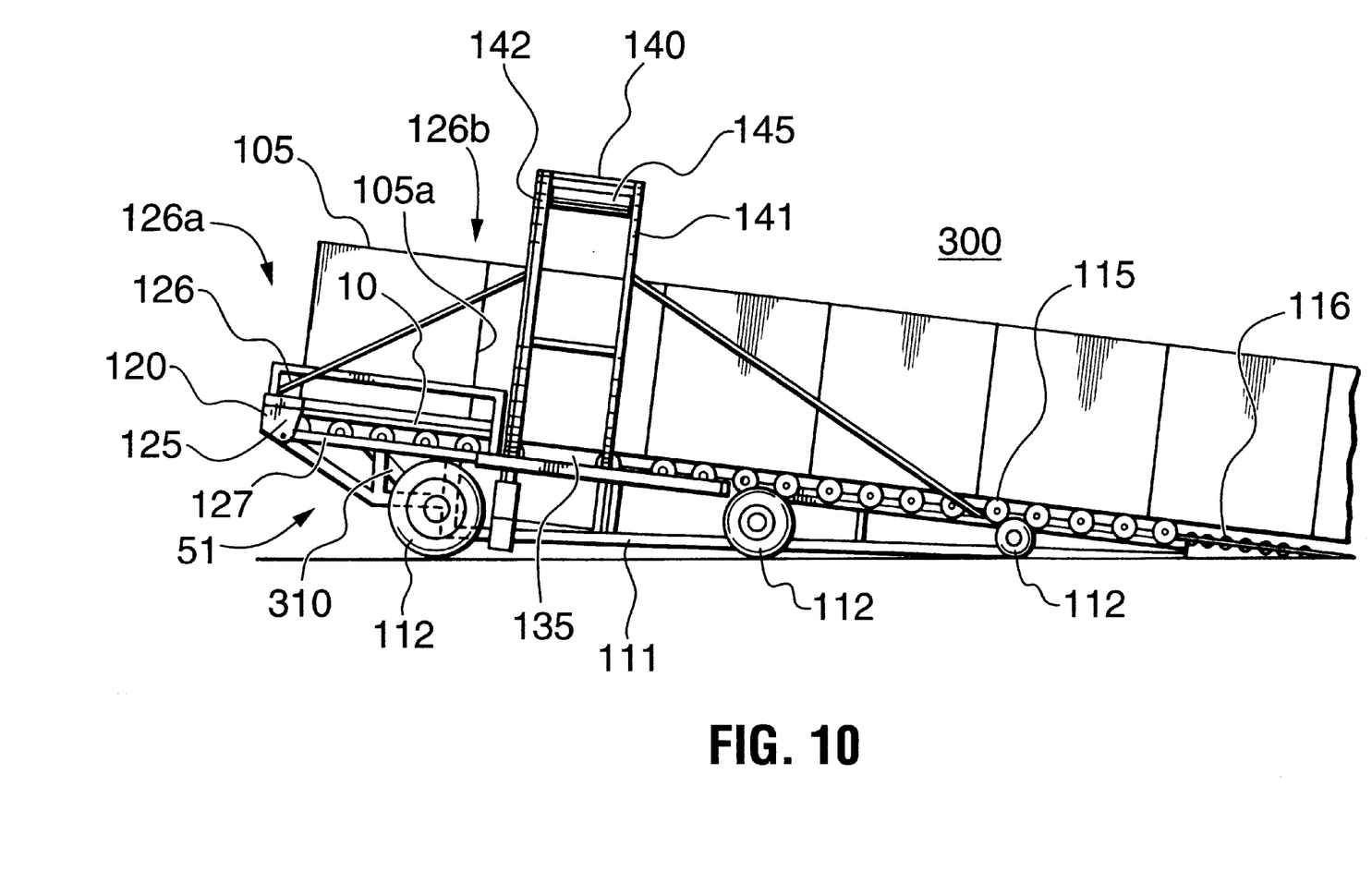
FIG. 10 is a side view of a bale wrapping machine of another embodiment of the invention.

The common features among the bale wrapping machines 110, 200 and 300 are described in reference with FIG. 10. The bale wrapping machine 300 has a frame 111. The bale wrapping machine 300 also has a machine mover 112 which enables the machine 300 to move along a ground surface during the wrapping operation of bales. The bale wrapping machine 300 also has a bale receiving support 120, a bale wrapping device 140, an inclined support 115 and a bale mover 125. Bales are received by the bale receiving support 120 and translated into the bale wrapping device 115 along the bale receiving support 120 by the bale mover 125. The bale wrapping device 140 carries plastic strip 145 in the bale wrapping plane around the bale. Bales wrapped by the bale wrapping device 140 are transported down the inclined support 115 to a ground surface.

When the bale rotator 310 is not actuated, bales are wrapped end to end in a row, resulting in a row of wrapped bales lying on the ground along the track of the machine 300 due to the movement of the machine 300 enabled by the machine mover 112.

The bale wrapping machine 300 shown in FIG. 10 has, as the machine mover 112, three wheels in each side. The machine mover 112 may be also skis, sleds or any one or more mechanisms which allow movement of the machine 300 along the ground surface during the bale wrapping operation.

The bale receiving support 120 and the inclined support 115 may have rollers to facilitate the movement of bales along each support, as shown in FIG. 10. The tail end 116 of the inclined support 115 may be folded up or folded over the rest of the inclined support 115 when the machine 300 is not in use or carried to other locations.

In the bale wrapping device 140 shown in FIG. 10, a rotating hoop 141 carries plastic strip 145 around a bale. The rotating hoop 141 is rotatably supported by a fixed hoop 142 provided on the frame 111 of the machine 300. The rotating hoop 141 and the fixed hoop 142 may have different shapes, and may be located in different arrangements. Also, the rotating hoop 141 may be supported by one ore more fixed supports provided on the frame 111.

During the wrapping process of multiple bales end to end in a row, bales 105 are received by the receiving support 120 so that a flat end 105a faces to the bale wrapping device 140. The bales are moved through the rotating hoop 141 by the bale mover 125. The bale wrapping device 140 is located at a gap 135 between the bale receiving support 120 and the inclined support 115. Bales may be supported over the gap 135 by the pressure between the preceding bales and the bale mover 125. There may be one or more additional supports provided in the gap 135 between the bale receiving support 120 and the inclined support 115. The rotating hoop 141 is rotated about its axis by a rotating driver (not shown). It is preferable to synchronize the rotation of the hoop and the movement of the bale mover 125 in such a way that the rotating hoop 141 is rotated as a bale is moved through the rotating hoop 141. Rotation of the rotation hoop 141 is stopped when the bale is completely or partially wrapped. The rotational speed of the hoop may be varied to adjust the amount of overlap of plastic strip 145 on wrapped bales.

Any form of plastic strip may be used as long as it is suitable for wrapping bales. A reel of plastic strip may be conveniently used. It is preferable to use a stretchable plastic strip and to provide a tension to the strip by tension rolls during the wrapping operation, so that bales are tightly wrapped.

The bale mover 125 may use any moving mechanism and power source as long as it can move bales along the receiving support 120 to the bale wrapping device 140.

It is preferable that the bale mover 125 comprises a ram cross member 126 and a pair of hydraulic rams or ram cylinders 127 extending along the sides of the bale receiving support 120. The ram cross member 126 is supported across the pair of rams 127, and moved by the rams 127 between a bale receiving position 126a for receiving a bale and a bale pushing position 126b for pushing the bale towards the bale wrapping device 140. In this embodiment, the rams 127 are provided in such a way that the ram cross member 126 is positioned at a bale receiving position 126a when the rams are extended, and the ram cross member 126 is positioned at a bale pushing position 126b when the rams are retracted.

According to the present invention, the bale wrapping machine is provided with a bale rotators. The bale rotator rotates a bale in a plane at an angle relative to a bale wrapping plane in which the bale wrapping device 140 carries plastic strip 145 around the bale.

Referring back to FIG. 1, the bale wrapping machine 110 is provided with a pair of powered rollers 130a, 130b. One powered roller 130a is located at an end 120a of the bale receiving support 120 adjacent to the bale wrapping device 140. The other powered roller 130b is located at an end 115a of the inclined support 115 adjacent to the bale wrapping device 140. The powered rollers 130a, 130b may be provided on the frame 111 of the bale wrapping machine 110 adjacent the end 120a of the bale receiving support 120 and the end 115a of the inclined support 115, respectively.

Figure 1:
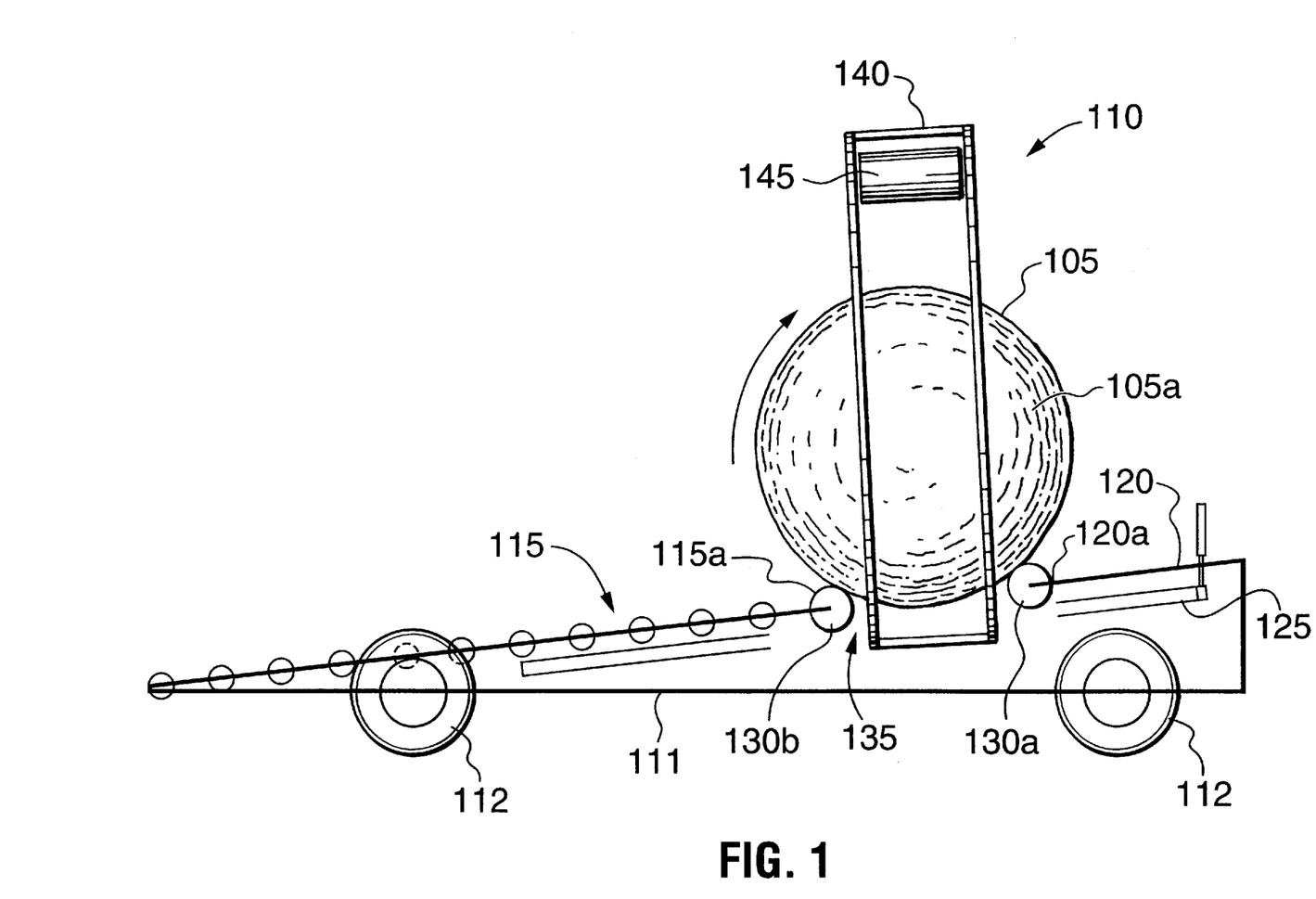
FIG. 1 is a side elevation view of a first embodiment of the invention.

The powered rollers 130a, 130b are provided substantially parallel to the bale wrapping plane, i.e. the plane in which the bale wrapping device 140 carries the plastic strip 145 around the bale 105. Thus, the power rollers 130a, 130b can rotate the bale 105 in a plane perpendicularly to the bale wrapping plane in the bale wrapping device during the wrapping operation of the bale 105.

In operation of wrapping the bale 105 individually by the single/multi wrapper 110, the bale 105 is loaded onto the receiving support 120 transversely, i.e. rotated 90°, relative to the orientation of bales when the bales are wrapped end to end in a row. In other words, the flat end 105a of the bale 105 is positioned parallel to the plane of the inclined support 115 and the receiving support 120. The bale mover 125 is then operated to move the bale 105 towards the bale wrapping device 140. This causes the bale 105 to rest on the two powered rollers 130a, 130b, one each side of the gap 135 between the bale receiving support 120 and the inclined support 115.

To wrap the bale 105, the powered rollers 130a, 130b rotate the bale 105 during the wrapping operation. This applies plastic strip 145 in layers over the entire surface of the bale 105.

The powered rollers 130a, 130b may rotate the bale 105 while the bale wrapping device 140 is carrying the plastic strip 145 around the bale 105. The bale wrapping device 140 may be stopped when the powered rollers 130a, 130b are actuated to rotate the bale 105.

It is preferable that the powered rollers 130a, 130b rotate the bale 105 by a preset amount each time the plastic strip 145 is carried around a complete circle of the bale 105. The amount by which the rollers 130a, 130b rotates the bale 105 gives the number of layers of plastic strip 145 applied.

Such rotation control may be done mechanically by levers (not shown) mounted on the bale wrapping device 140 triggering a valve or a switch (not shown) which rotates at least one of the powered rollers 130a, 130b by a preset amount. It is preferable to rotates both powered rollers 130a, 130b together.

It is preferable that the bale 105 is rotated when the plastic strip 145 is moving or stopped over the top of the bale 105, as opposed to when the plastic strip 145 is moving or stopped between the powered rollers 130a, 130b under the bale 105, Thus, the problem of the plastic strip 145 coming into contact with the powered rollers 130a, 130b may be avoided.

When the bale 105 is completely wrapped or covered with the plastic strip 145, the bale mover 125 is used to move the bale 105 off the powered rollers 130. The bale 105 is further moved down the inclined support 115 to the ground. An additional bale moving mechanism may be used to push the bale 105 through the bale wrapping device 140, as described later in reference with FIG. 6.

While a pair of powered rollers 130a, 130b is used in this embodiment, a single powered roller or more than two powered rollers may be also used. When a single powered roller is used, it is preferable to provide a smooth surface or a non-powered roller where the bale contacts so as to ease rotation of the bale.

Also, the location and the angle of each powered roller may be changed as long as the bale 105 is rotated in the bale wrapping device 140 in a plane at angle relative to the bale wrapping plane in which the plastic strip 145 is carried around the bale.

Referring to FIGS. 2 to 5, the rotation of a bale 20 may be also carried out using a bale rotator 5 comprising a rotating support or hinged portion 10 and a support actuator 15.

The rotating support 10 supports the bale 20. The support actuator 15 actuates rotation of the rotating is support 10 in a plane at angle relative to the bale wrapping plane. That is, the support actuator 15 is connected to the rotating support 10. The rotating support 10 is pivotably supported by the frame 111 or the inclined support 115, The support actuator 15 pivots the rotating support 10, and flips the bale 20 into the bale wrapping device 140.

The support actuator 15 may be any kind of actuator as long as it is strong enough to rotate the rotating support. A linear actuator may be preferably used.

The rotating support 10 may be a table, frame or the like.

Figure 2:
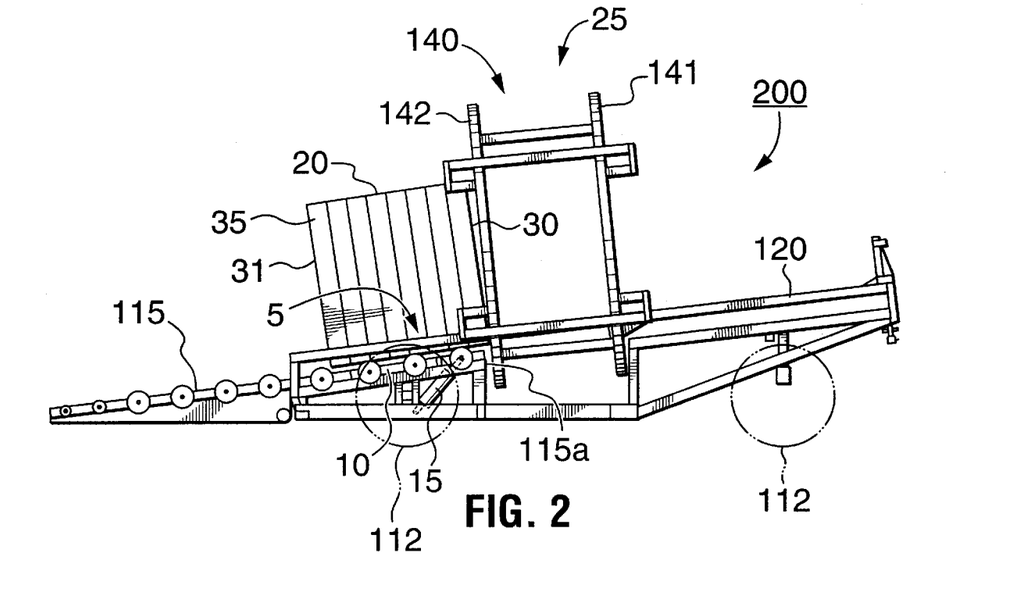
FIG. 2 is a side elevation view of a second embodiment of the invention.

In the wrapping operation of individual bales, one bale 20 is received by the bale receiving support 120 in the regular horizontal position so that an flat end 31 of the bale 20 faces the bale wrapping device 140. The bale 20 is pushed towards a bale chamber 25 of the bale wrapping device 140 by the bale mover 125. In the bale chamber 25 of the bale wrapping device 140, the bale 20 is wrapped vertically with plastic strip 145. Thus, a layer of wrap 35 is formed on the bale 20. As shown in FIG. 2, the bale 20 is moved through the bale chamber 25 until front part 30 of the bale 20 comes into the hale support 10 of the bale rotator 5, The bale 20 may be pushed through the bale wrapping device using an additional bale moving mechanism, as described later.

Figure 3:
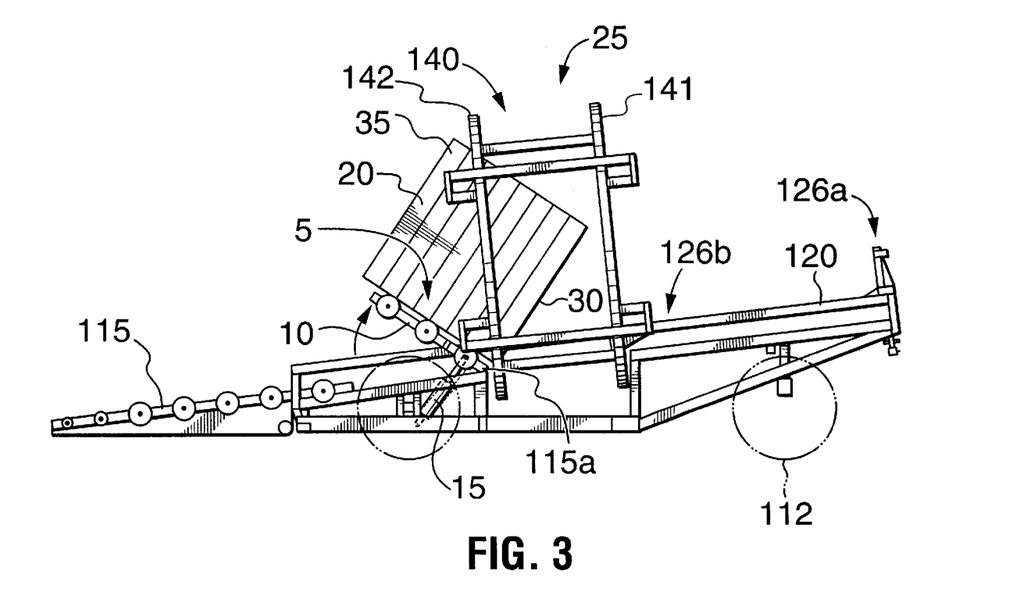
FIG. 3 is a side elevation view of the second embodiment of the invention.
Figure 4:
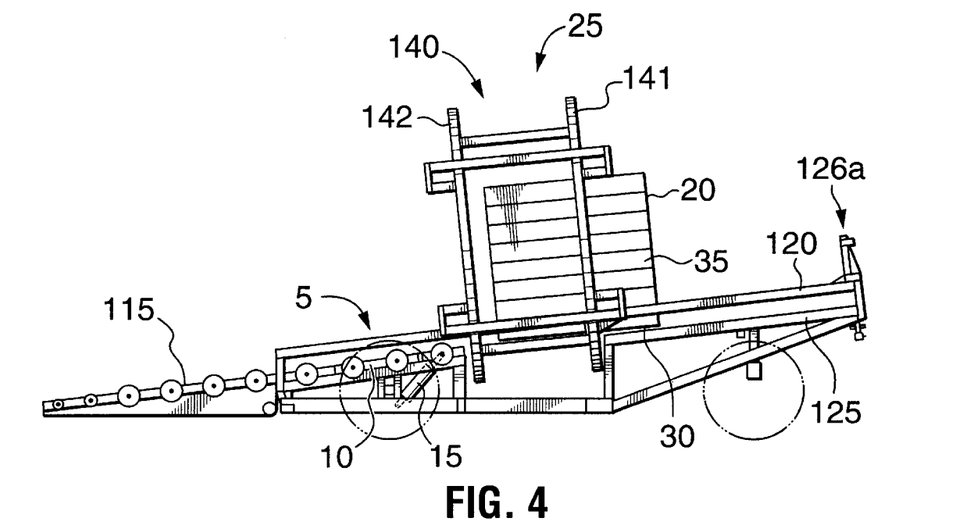
FIG. 4 is a side elevation view of the second embodiment of the invention.

As shown in FIG. 3, the support actuator 15 pivots the bale support 10 to rotate or flip bale 20 back into the bale chamber 25 of the bale wrapping device 140. Thus, the bale 20 sits vertical with the front part 30 down, as shown in FIG. 4. The layer of wrap 35 becomes a horizontal layer. The support actuator 15 is retracted.

Figure 5:
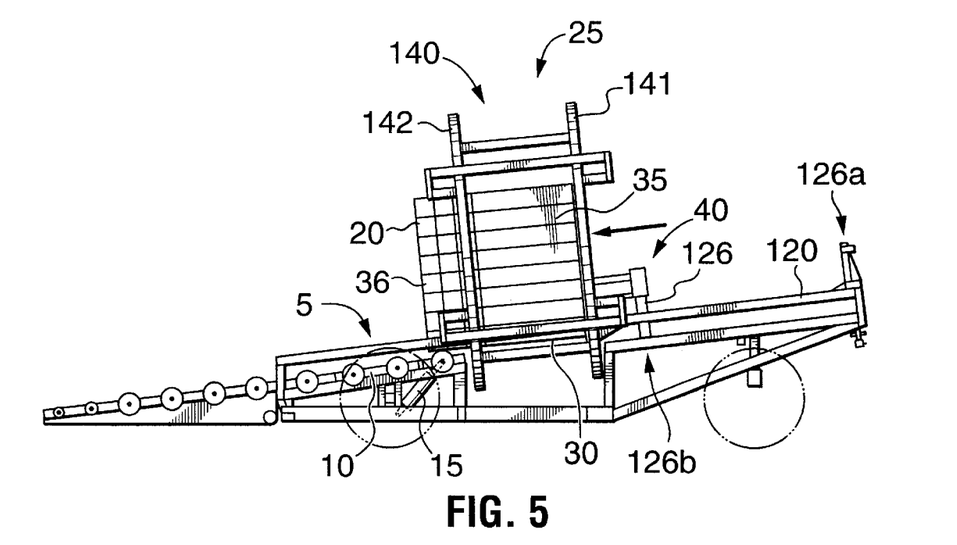
FIG. 5 is a side elevation view of the second embodiment of the invention.

The bale 20 is, in this vertical orientation, moved through the bale chamber 25 towards the bale receiving support 120, then again moved through the bale chamber 25 towards the inclined support 115, as shown in FIG. 5.

The bale 20 is wrapped vertically while it is moved through the bale chamber 25 again towards the inclined support 115. Thus, a layer of wrap 35 horizontally and a layers of wrap 36 vertically are formed on the bale 20, as shown in FIG. 5.

The bale 20 may be wrapped vertically when it is moved towards the bale receiving support 120. The bale 20 may be also wrapped vertically when it is moved both towards the receiving support 120 and towards the inclined support 115. In this case, two layers of vertical wrap can be formed.

The plastic strip 145 may be wrapped overlapping, Thus, a layer of wrap 35, 36 may have partially overlapping portions or sub-layers therein.

In FIGS. 2–5, the bale rotator 5 is provided adjacent the inclined support 15. However, a bale rotator 5' may be provided adjacent the bale receiving support 10, as shown in FIG. 10.

An additional support (not shown) may be provided for supporting the bale 20 in an inclined position as being tilted by the bale rotator 5. The bale may be supported in an inclined position after it is flipped by the bale rotator 5.

Thus, the second layer of wrap 36 is formed at an angle other than 90° relative to the first layer of wrap 35.

In the above embodiments, the bale is rotated in a plane which is perpendicular to the bale wrapping plane. However, the bale may be rotated in a plane at any angle relative to the bale wrapping plane. For example, the bale may be rotated in the plane of the inclined support.

In order to wrap bales individually, each bale needs to be pushed through the bale wrapping device 140 of the bale wrapping machine 110, 200, 300. An elongated push member or push pole (not shown) may be used for this purpose. The push pole may be attached to the bale mover 125 when it is in use.

However, it is preferable to provide the bale wrapping machine 110, 200, 300 with an additional bale mover which is retractable from a path of bales. Thus, the additional bale mover does not need to be removed from the bale wrapping machine when it is not in use.

Figure 6:
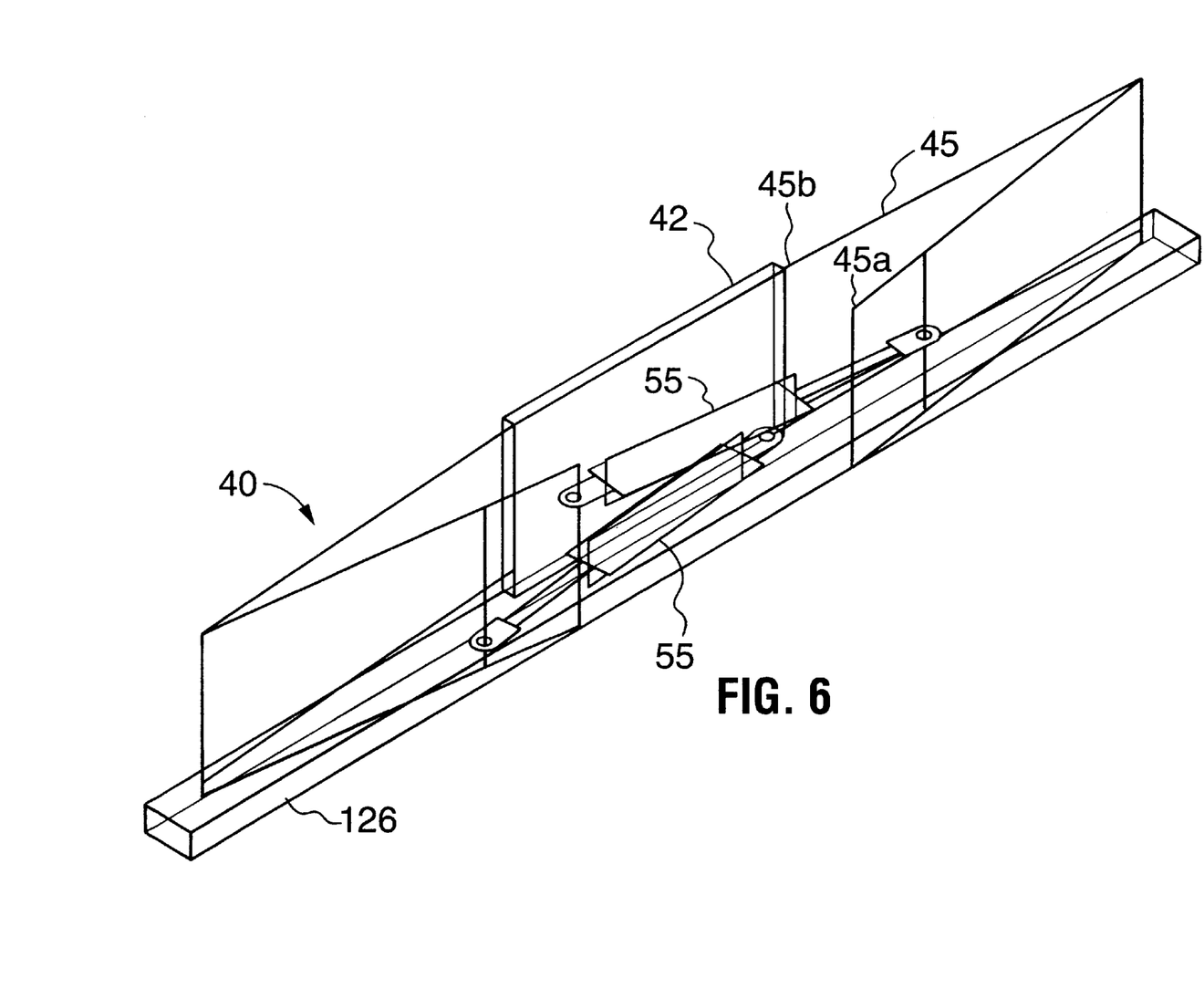
FIG. 6 is a perspective view of a linkage of the second embodiment of the invention.
Figure 7:
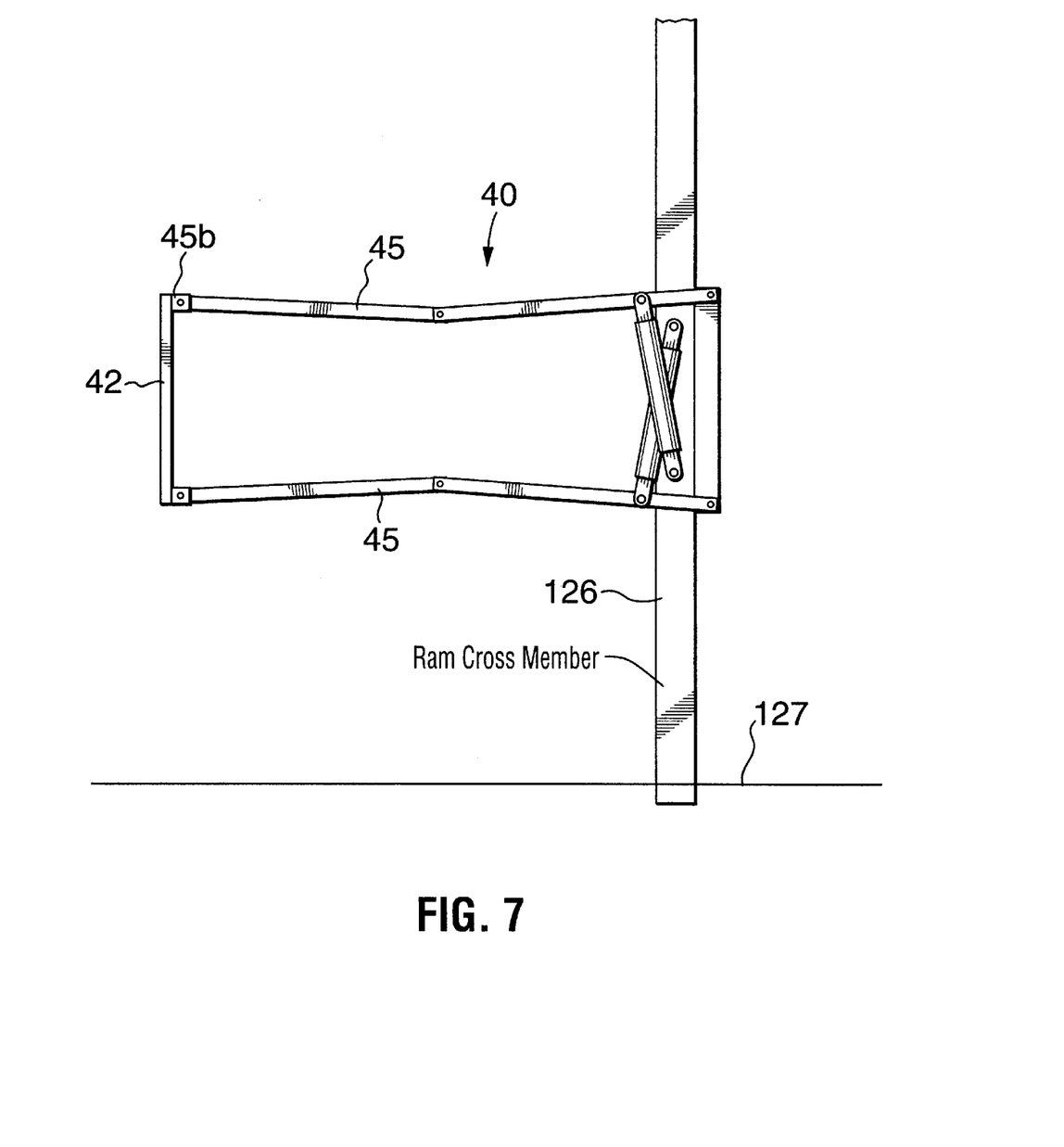
FIG. 7 is a top plan view of a linkage of the second embodiment of the, invention.
Figure 8:
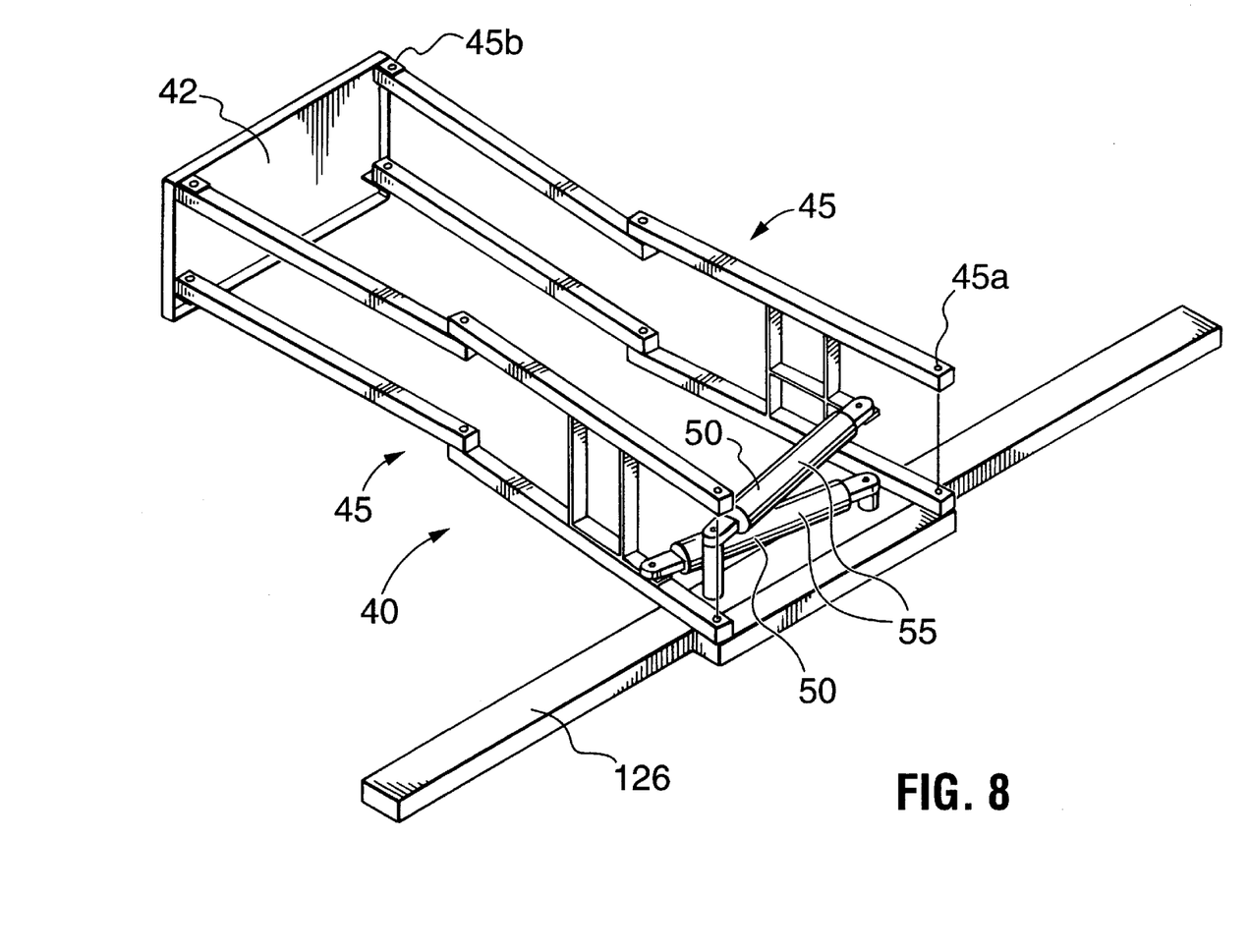
FIG. 8 is a perspective view of a linkage of the second embodiment of the invention.

Referring to FIGS. 6 to 8, an example of the additional bale mover is described. The additional bale mover comprises a powered push device 40, The powered push device 40 includes a pair of powered linkages 45 and a push member 42 provided at distal ends 45b of the powered linkages 45. The proximal ends 45a of the powered linkages 45 are pivotably mounted to the ram cross member 126 of the bale mover 125. The powered linkages 45 are actuated by two linear actuators 55 provided adjacent the proximal ends 45a of the powered linkages 45.

FIG. 6 shows the powered push device 40 when the powered linkages 45 are retracted. In this figure, the powered linkages 45 are shown by lines for simplicity of the drawing. FIGS. 7 and 8 show the powered push device 40 when the powered linkages 45 are extended. The linkages 45 go over centre in the extended position. This relieves tension on the actuators 55.

When the ram cross member 126 is positioned at the bale posh position 126b as shown in FIG. 5, the push device 40 is actuated. The powered linkages 45 are extended by the linear actuators 55. The push member 42 pushes the bale 20 through the bale wrapping device 140.

The powered push device 40 may be also used to move back the bale 20 towards the bale receiving support 120 through the bale wrapping device 140 while the powered linkages 45 are being retracted. In this case, the two linkages 45 may be spaced apart from each other, so that the bale is received between the linkages 45 and pushed back by the push member 42. The push member 42 may be projecting upwardly over the linkages 45, so that the projecting potion of the push member 42 can push back the bale 20.

Instead of the push member 42, a bale carrying member may be used to carry the bale thereon.

Also, instead of being mounted on the ram cross member 126, the powered push device 40 may be provided adjacent the inclined support 115. It may be mounted on the frame 111 or on the inclined support 115. In this case, the bale is moved towards the bale receiving support 120 when the powered linkages are being extended, towards the inclined support 115 when the powered linkages are being retracted.

The number of the linkages 45 and the number of the linear actuators 55 may be changed as long as the push member 42 or a bale carrying member can moves the bale.

It is preferable that the bale wrapping machine 110, 200, 300 is provided with a cutting mechanism for cutting the plastic strip 145 once the bale wrapping process has been completed. The cutting mechanism also retains hold of the end of the cut plastic strip 145. Thus, the next wrapping operation can be started without manually applying the end of the plastic strip 145 to the next bale.

Figure 9:
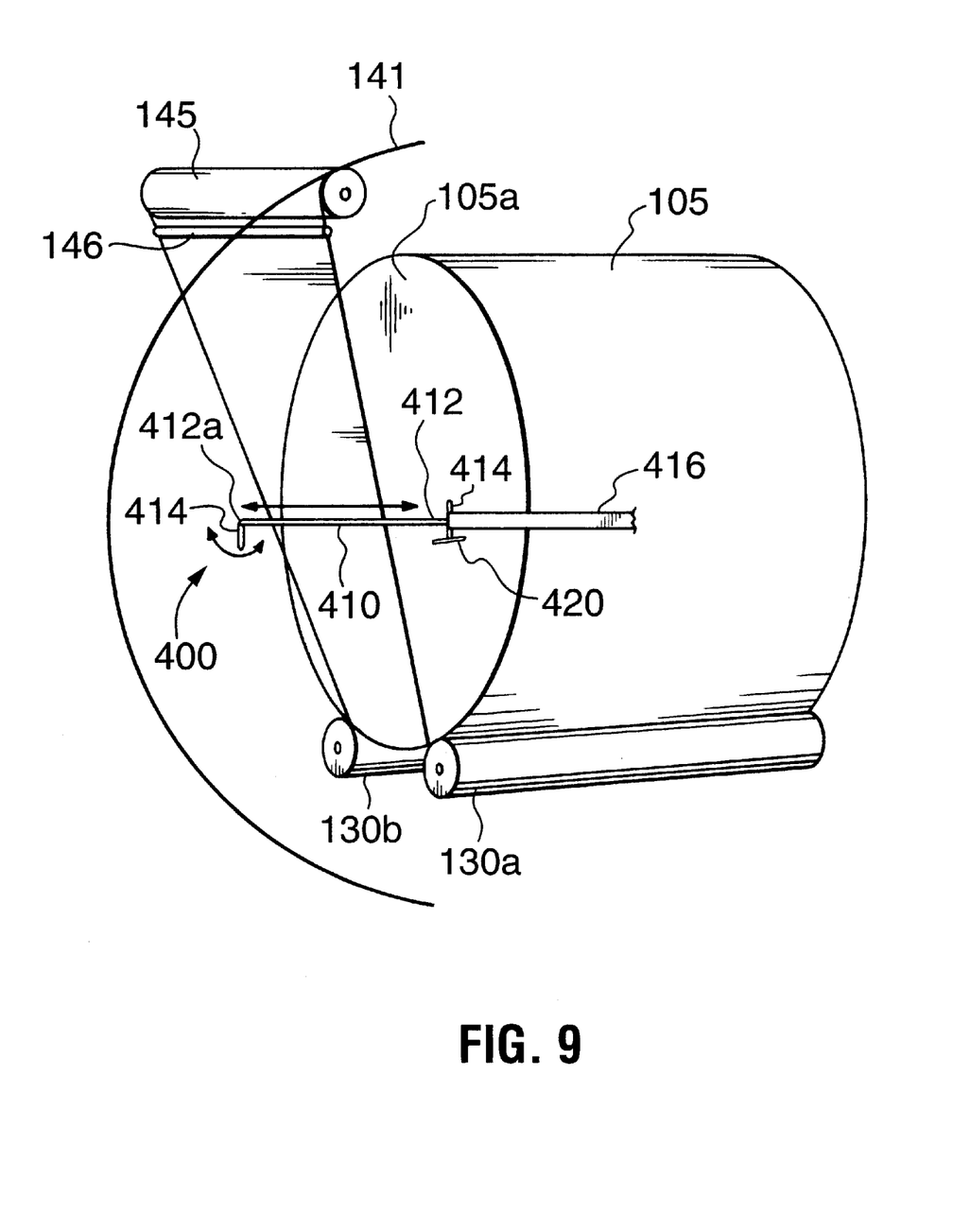
FIG. 9 is a partial perspective view of a plastic strip cutter used in the first embodiment of the invention.

FIG. 9 shows an example of a cutting mechanism 400, using the embodiment shown in FIG. 1. The cutting mechanism 400 comprises a grab mechanism 410 having a clamp 414 and an extending bar 412 supporting the clamp 414 at its distal end 412a. The extending bar 412 is retractable in a bar support 416.

When the wrapping of the bale 105 is completed, plastic strip 145 is extended between the bale 105 and a stretcher 146 stretching the plastic strip 145. The extending bar 412 extends along the width of the plastic strip 145 between the stretcher 146 and the bale 105. The clamp 414 clamps the plastic strip 145 before the bale 105 is pushed off the bale wrapping device 140. This grab mechanism 410 tears the plastic strip at the bale side of the clamp 414. The clamp 414 retains hold of the plastic strip 145 until another bale has been loaded onto the bale wrapping device 140. The clamp 414 preferably retains hold of the plastic strip 145 until another bale is wrapped at least one circle with the plastic strip 145. Then, the cramp 414 releases the plastic strip 145 and the grab mechanism 410 is withdrawn.

The cutting mechanism 400 may also have a cutter 420 built into the grab mechanism 410 to assist the tearing of the plastic strip 145. As shown in FIG. 9, the cutter 420 may be provided on the clamp 414.

It is preferable to stop the bale wrapping device 140 so as to stop the plastic strip 145 at the same position every time the wrapping process is completed. In this way, the clamp 414 may be provided on the frame 111 of the bale wrapping machine, and extend into the bale wrapping device 140 from the side of the bale wrapping machine.

In the above embodiments, the bale wrapping machines 110, 200 and 300 are equipped with the bale rotators 130, 5 and 5', respectively. However, a bale rotator device may be a separate device from a bale wrapping machine. In that case, the bale rotator is provided with a bale rotator connector to connect the bale rotator to a bale wrapping machine at a suitable position as described above.

The present invention may be used to wrap round bales or square bales.

While particular embodiments of the present invention have been shown and described, changes and modifications may be made to such embodiments without departing from the true scope of the invention. For example, the rams may be provided in the other direction, or a single ram or more than two rams may be used. The number of hoops used and the design of the bale wrapping device may be also modified.

What is claimed is:

1. A bale wrapping machine for wrapping bales with plastic strip, the bale wrapping machine comprising:
   a machine mover for enabling the machine to move along a ground surface during the wrapping operation of bales;
   a bale receiving support for receiving bales;
   a bale wrapping device adjacent the bale receiving support for carrying plastic strip around a bale in a bale wrapping plane;
   an inclined support adjacent the bale wrapping device for transporting wrapped bales to a ground surface;
   a first bale mover for moving bales from the bale receiving support towards the bale wrapping device; and
   a bale rotator adjacent the bale wrapping device for rotating a bale in a bale rotating plane at an angle to the bale wrapping plane so that the bale wrapping machine wraps bales individually when the bale rotator is activated, and it wraps multiple bales end to end in a row when the bale rotator is inactivated.

2. The bale wrapping machine as claimed in claim 1, wherein the bale rotator rotates a bale in the bale wrapping device during the wrapping of the bale.

3. The bale wrapping machine as claimed in claim 2, wherein the bale rotator comprises a powered roller.

4. The bale wrapping machine as claimed in claim 2, wherein the bale rotating plane is perpendicular to the bale wrapping plane.

5. The bale wrapping machine as claimed in claim 1, wherein the bale rotator comprises at least two powered rollers for rotating a bale in a plane perpendicular to the bale wrapping plane, one of the powered rollers is located adjacent an end of the bale receiving support near the bale wrapping device, and another one of the powered rollers is located adjacent an end of the inclined support near the bale wrapping device.

6. The bale wrapping machine as claimed in claim 1, wherein the bale rotator comprises:
   a rotating support for supporting a bale; and
   a support actuator for actuating rotation of the rotating support in the bale rotating plane.

7. The bale wrapping machine as claimed in claim 6, wherein the bale rotator is located adjacent the inclined support and outside the bale wrapping device.

8. The bale wrapping machine as claimed in claim 6, wherein the bale rotator is located adjacent the bale receiving support and outside the bale wrapping device.

9. The bale wrapping machine as claimed in claim 6, wherein the support actuator pivots the rotating support so as to flip the bale.

10. The bale wrapping machine as claimed in claim 9, wherein the support actuator pivots the rotating support so as to flip the bale into the bale wrapping device.

11. The bale wrapping machine as claimed in claim 6, wherein the support actuator comprises a linear actuator.

12. The bale wrapping machine as claimed in claim 1, wherein the bale rotator further comprises a second bale mover for moving bales through the bale wrapping device.

13. The bale wrapping machine as claimed in claim 12, wherein the second bale mover moves bales from the bale receiving support towards the inclined support.

14. The bale wrapping machine as claimed in claim 12, wherein the second bale mover moves bales from the inclined support towards the bale receiving support.

15. The bale wrapping machine as claimed in claim 12, wherein the second bale mover is connected to the first bale mover.

16. The bale wrapping machine as claimed in claim 12, wherein the second bale mover is retractive.

17. The bale wrapping machine as claimed in claim 12, wherein the second bale mover comprises:
   a bale move member for moving bales;
   a mover actuator; and
   a linkage for linking the bale move member to the mover actuator so that the bale move member is moved by the mover actuator.

18. The bale wrapping machine as claimed in claim 1, wherein the bale wrapping machine further comprises a cutting mechanism for cutting the plastic strip when the wrapping of bales is completed.

19. The bale wrapping machine as claimed in claim 18, wherein the cutting mechanism comprises a grab mechanism for clamping the plastic strip to tear it and retaining hold of the plastic strip until another bale is loaded in the bale wrapping device.

20. A bale rotating device for rotating a bale in a bale wrapping machine for wrapping multiple bales end to end in a row with plastic strip, the bale rotating device comprising:

a bale rotator for rotating a bale in a bale rotating plane at an angle to a bale wrapping plane in which a bale wrapping device of the bale wrapping machine carries plastic strip around the bale; and a bale rotator connector for connecting the bale rotator to the bale wrapping machine so that the bale wrapping machine wraps bales individually when the bale rotator is activated, and the bale wrapping machine wraps multiple bales end to end in a row when the bale rotator is inactivated.

21. The bale rotating device as claimed in claim 20, wherein the bale rotator rotates a bale in the bale wrapping device during the wrapping of the bale.

22. The bale rotating device as claimed in claim 21, wherein the bale rotator comprises a powered roller.

23. The bale rotating device as claimed in claim 22, wherein the bale rotator connector rotatably connects the powered roller adjacent the bale wrapping device.

24. The bale rotating device as claimed in claim 21, wherein the bale rotating plane is perpendicular to the bale wrapping plane.

25. The bale rotating device as claimed in claim 21, wherein:

the bale rotator comprises at least two powered rollers for rotating a bale in a plane perpendicular to the bale wrapping plane; and the bale rotator connector rotatably connects one of the powered rollers adjacent an end of a bale receiving support of the bale wrapping machine near the bale wrapping device, and another one of the powered rollers adjacent an end of an inclined bale discharging support of the bale wrapping machine near the bale wrapping device.

26. The bale rotating device as claimed in claim 20, wherein the bale rotator comprises:

a rotating support for supporting a bale; and a support actuator for actuating rotation of the rotating support in the bale rotating plane.

27. The bale rotating device as claimed in claim 26, wherein the bale rotator connector connects the bale rotator adjacent an inclined bale discharging support of the bale wrapping machine and outside the bale wrapping device.

28. The bale rotating device as claimed in claim 27, wherein the bale rotator connector connects the bale rotator adjacent the bale receiving support and outside the bale wrapping device.

29. The bale rotating device as claimed in claim 27, wherein the support actuator pivots the bale rotator support so as to flip the bale.

30. The bale rotating device as claimed in claim 29, wherein the support actuator pivots the rotating support so as to flip the bale into the bale wrapping device.

31. The bale rotating device as claimed in claim 26, wherein the support actuator comprises a linear actuator.

* * * * *

UNITED STATES PATENT AND TRADEMARK OFFICE
CERTIFICATE OF CORRECTION

Page 1 of 1

PATENT NO.   : 6,082,076
DATED        : July 4, 2000
INVENTOR(S)  : David W. Anderson, et al.

It is certified that error appears in the above-identified patent and that said Letters Patent is hereby corrected as shown below:

Title Page, Item [57]
Line 2, "wrape" should be --wraps--.
Line 2, "multiples" should be --multiple--.
Line 2, before "end to end" insert --bales--.
Line 2, "when" should be --When--.

Column 2,
Line 28, after "the" delete --,--.

Column 3,
Line 61, "rotators." should be --rotator.--.

Column 5,
Line 11, after "rotating" delete --is--.
Line 32 "hale" should be --bale-- and "5," should be --5.--.

Column 6,
Line 21, "40," should be --40.--.

Signed and Sealed this

Tenth Day of July, 2001

*Attest:*

NICHOLAS P. GODICI
*Attesting Officer*    *Acting Director of the United States Patent and Trademark Office*